United States Patent [19]
Sienack

[11] Patent Number: 5,385,603
[45] Date of Patent: Jan. 31, 1995

[54] DEVICE FOR DRYING A GAS

[75] Inventor: Desideratus Sienack, Aartselaar, Belgium

[73] Assignee: Atlas Copco Airpower, Wilrijk, Belgium

[21] Appl. No.: 46,949

[22] Filed: Apr. 15, 1993

[30] Foreign Application Priority Data

Apr. 15, 1992 [BE] Belgium ............................ 09200338

[51] Int. Cl.⁶ .............................................. B01D 53/06
[52] U.S. Cl. ......................................... 96/125; 96/128; 96/130; 96/150
[58] Field of Search .................................. 95/105–107, 95/113, 115, 120, 123–125; 96/125, 128, 130, 150

[56] References Cited

U.S. PATENT DOCUMENTS 3,847,578  11/1974  Munters .............................. 96/150 X
4,191,544   3/1980  Boll et al. ............................ 96/130
4,863,497   9/1989  Grenier et al. ...................... 96/125 X Primary Examiner—Robert Spitzer
Attorney, Agent, or Firm—Foley & Lardner

[57] ABSTRACT

Device for drying a gas, consisting of a dryer (2) of the type using a pressure vessel (3) with a drying zone (4) and regeneration zone (5), with an adsorption and/or absorption medium (6) which is brought alternatively through the drying zone (4) and the regeneration zone (5); a main canalization (7) allowing that the gas to be dried is led through the drying zone (4) of the dryer (2); an auxiliary canalization (8) allowing that part of the gas to be dried is led through the regeneration zone (5) of the dryer (2) and taked up moisture herein; a cooler (9, 47, 53, 62, 66) providing in the cooling of the gas from the auxiliary canalization (8), whereby liquid excretion takes place; and a blending device (10) for adding the gas from the auxiliary canalization (8) back to the gas in the main canalization (7), characterized in that the blending device (10) is integrated in the dryer (2).

24 Claims, 8 Drawing Sheets

DEVICE FOR DRYING A GAS

This invention relates to a device for drying a gas, more specifically for drying a compressed gas.

In particular, the invention relates to a device for drying a gas of the type consisting of a dryer using a pressure vessel with a drying zone and regeneration zone, with an adsorption and/or absorption medium which is brought alternatively through the drying zone and the regeneration zone; a main canalization allowing that the gas to be dried is led through the drying zone of the dryer; an auxiliary canalization allowing that part of the gas to be dried is led through the regeneration zone of the dryer and takes up moisture herein; a cooler providing in at least the cooling of the gas in the auxiliary canalization, whereby liquid excretion takes place; and a blending device, such as an ejector, for adding the gas from the auxiliary canalization back to the gas in the main canalization.

With such device, the information is applied that a gas compressed by means of a compressor has such a high temperature and consequently such low moisture percentage, that an effluent thereof can be branched to be applied for the regeneration of the adsorption and/or absorption medium, whereby the effluent is led through the regeneration zone of the dryer and thereby discharges the moisture which is brought from the drying zone in the regeneration zone.

A device of the above-mentioned type is known from the German patent No. 2.238.551. Hereby, said dryer, cooler and ejector are mounted separately and are connected to each other by means of a number of pipes. A disadvantage herein exists in that the ejector has to be manufactured relatively heavy in order to resist to the high pressures and in that, moreover, a large number of pipe connections is required.

The present invention aims at a device which does not present the above-mentioned disadvantages.

The invention also aims at a device for drying a gas which is more compact than the existing devices of the above-mentioned type.

To this end, the invention relates to a device for drying a gas, existing of a dryer of the type using a pressure vessel with a drying zone and a regeneration zone, with an adsorption and/or absorption medium which is brought alternatively through the drying zone and the regeneration zone; a main canalization allowing that the gas to be dried is led through the drying zone of the dryer; an auxiliary canalization allowing that part of the gas to be dried is led through the regeneration zone of the dryer and takes up moisture therein; a cooler providing in at least the cooling of the gas from the auxiliary canalization, whereby liquid excretion takes place; and a blending device for adding the gas from the auxiliary canalization back to the gas in the main canalization, characterized in that the blending device is integrated in the dryer.

Because the blending device is integrated in the dryer, the advantage is obtained that the former can be manufactured considerably simpler and cheaper, as it no longer has to be proof against high pressure differences. Moreover, the connection conduit between the blending device and the pressure vessel of the dryer is no longer necessary.

In a particular embodiment, a rotating drying element is used and for the blending device use is made of an ejector which is mounted centrally in the dryer in such a way that it also serves as a rotation shaft for the drying element.

According to an other particular embodiment, the dryer is realized in such a way that the rotation shaft of said rotating drying element, and more specifically the ejector, is mounted vertically, which enables a better water excretion. The vertical disposition of the drying element also allows a flat bearing, whereby the lubrification happens by the present moisture from the gas, so that a bearing by means of ball-bearings, which is expensive and demands maintenance, is avoided.

According to yet an other particular characteristic, said cooler is also integrated in the pressure vessel of dryer, with as a result that the former can be constructed in a constructively simpler way.

In order to better show the characteristics of the invention, hereafter some preferred embodiments are described, as examples with no limiting character whatsoever, reference being made to the accompanying drawings, in which.

Figure 1:
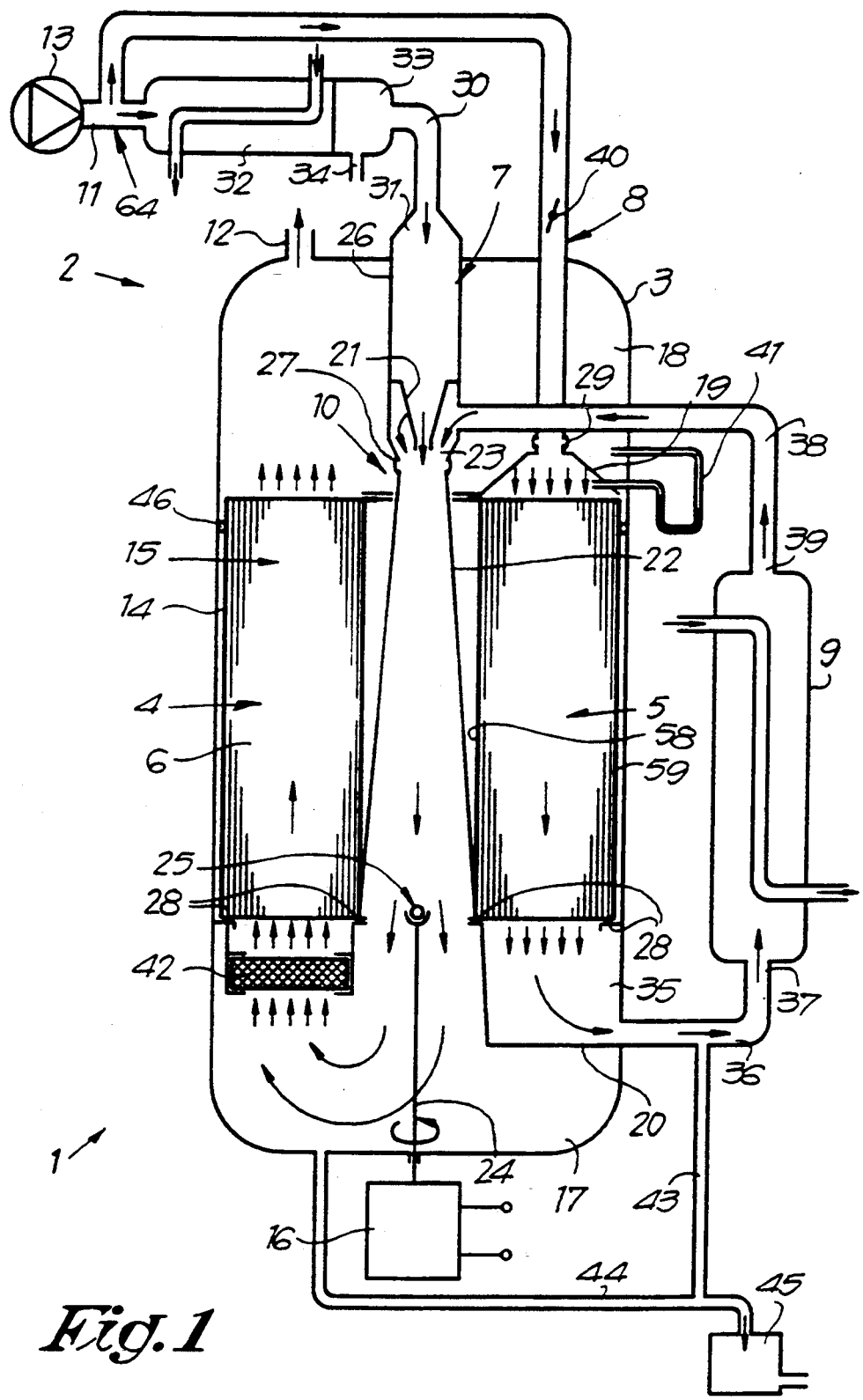
FIG. 1 represents a device according to the invention.

As represented in FIG. 1, the device 1 for drying the gas mainly consists of a dryer 2 of the type using a pressure vessel 3 with a drying zone 4 and regeneration zone 5, with an adsorption and/or absorption medium 6 which is alternatively led through the drying zone 4 and the regeneration zone 5; a main canalization 7 allowing that the gas to be dried is led through the drying zone 4 of the dryer 2; an auxiliary canalization 8 allowing that part of the gas to be dried is led through the regeneration zone 5 of the dryer 2 and takes up moisture herein; a cooler 9 providing in the cooling of the gas of the auxiliary canalization 8, whereby simultaneously liquid excretion takes place; and a blending device 10 for adding the gas from the auxiliary canalization 8 back to the gas from the main canalization 7, whereby according to the invention the blending device 10 is integrated in the dryer 2, more specifically in the pressure vessel 3, in such a way that the latter need not present a pressure-proof construction.

The device 1 shows an inlet 11 through which the gas to be dried, in other words gas with a condensable vapour component, can be added and an outlet 12 from which the dried gas can be tapped. The device is primarily destined for drying compressed air originating from a compressor 13, but nothing prevents that the device is used for drying other gases.

The dryer 2 presents a rotor 14 which mainly consists of a cylindrical drying element 15 which is composed of said adsorption and absorption medium. The drying element 15 is for instance of the type as disclosed in the U.S. Pat. No. 4,391,667.

The rotor 14 is powered by means of an electric motor 16 which is provided with a reduction gear in such a way that the rotation speed of the rotor 14 is low, for instance seven revolutions per hour.

The dryer 2 shows a wet room 17 and a dry room 18 which border respectively the inlet and the outlet of the drying zone 4.

A sector of the rotor 14 is masked near its axial extremities, for instance by means of screens 19 and 20, so that in the dryer 2 a regeneration zone 5 as mentioned above is formed, besides the wet room 17 and the dry room 18. The remaining part of the rotor 14 resides in the drying zone.

The blending device 10 preferably exists of an ejector, hereafter also referred to with reference 10, which consists, as is known, of a jet pipe 21, a blending pipe 22 cooperating therewith, and a suction opening 23 between the jet pipe 21 and the blending pipe 22. The blending pipe 22 is realized diverging according to the flow direction, so that a pressure recovery takes place herein.

According to the invention, the ejector 10 is located centrally in the dryer 2 and extends axially through the rotor 14. It is therefore preferably used as a shaft for the rotor 14.

In the embodiment of FIG. 1, the jet pipe 21 is fixedly mounted in the pressure vessel 3, but the blending pipe 22 forms part of the rotor 14, so that the blending pipe 22 can be used as a driving shaft for the rotor 14. The blending pipe 22 is in its turn connected to the motor 16 by means of an axial shaft 24 which is connected to the blending pipe 22 by means of a coupling 25.

Between the fixed part 26 of the ejector 10 and the rotating pipe 22, a sealing 27 is applied.

Also according to the invention, the dryer 2 is preferably mounted vertically, in other words so that the rotor 14 is rotatable around a vertical axis.

The ejector 10 is preferably mounted in such a way that the flow direction is directed vertically down, which offers the advantage that a good pre-excretion of liquid droplets takes place at the bottom of the device.

The vertical disposition also offers the advantage that the rotor 14 can easily be borne by laying it on one or more supports 28 which form a flat bearing.

As the rotor 14 is only supported at the bottom, and it is made of a roll of paper or the like with rough measurement tolerances, it is possible that it somewhat oscillates at the upper side. The above-mentioned screen 19 therefore provides in an inlet piece, covering 90 degrees of the axial extremity of the rotor 14, which can execute a rocking movement. To this end, this screen 19 is connected by means of a flexible connection 29.

The screen 20, however, can, contrary to the embodiment known from DE 2.238.551, be fixed, as this joins the support 28, thus avoiding the need for a flexible screen.

The device 1 can be provided with means creating a temperature difference between the gas in the main canalization 7 and the gas in the auxiliary canalization 8. In the embodiment of FIG. 1 these means consist of a cooler placed in a conduit 30, which cooler is provided with a water separator 33 with a condensate outlet 34. The cooler 32 is preferably water cooled, but can also be air cooled for small capacities.

The above-mentioned main canalization 7 is therefore formed in FIG. 1 by consecutively the conduit 30 with the cooler 32, the ejector 10, the wet room 17, the drying zone 4, and the dry room 18 which is provided with the outlet 12.

In the example of FIG. 1 the above-mentioned cooler 9 is located outside the dryer 2 and only provides in the cooling of the gas which is led through the auxiliary canalization 8. This auxiliary canalization 8 consists of a conduit between the inlet 11 and the inlet piece of the regeneration zone 5 formed by the screen 19, the regeneration zone 5, an outlet compartment 35, a conduit 36 connecting the outlet compartment 35 to the inlet 37 of said cooler 9, the cooler 9 itself and a conduit 38 connecting the outlet 39 of the cooler 9 with the suction opening 23 of the ejector 10.

The cooler 9 is preferably water cooled and preferably uses the counter-current principle.

In the auxiliary canalization 8 preferably an adjustable throttle organ 40 is applied to establish at the inlet of the regeneration zone 5 a pressure which is lower than the pressure in the dry room 18, whereby the pressure difference to be realized can be for example 25 mm water column, thus enabling a controlled leak of dried air to the regeneration zone. The desired pressure can be read by means of a meter such as a U-tube 41.

At the inlet of the drying zone 6 a moisture excreter 42 can be applied in order to avoid that condensate droplets carried along by the gas current end up in the drying zone.

Of course the device is provided with the necessary means for branching away the condensate. In the example of FIG. 1 these means consist of the conduit 36 in which the condensate from the cooler 9 is gathered, the wet room 17 in which more condensate from the main current is gathered, collection conduits 43 and 44 and a liquid remover 45.

It is obvious that the device 1 is provided with the necessary partitions to avoid leak currents of the moist gas to dryer rooms. For instance, a partition 46 is provided around the rotor 14 in order to avoid moist gas to leak away from the wet room 17 around the rotor 14 to the dry room 18.

The device functions as follows. At the inlet 11 gas with a condensable component is supplied, for example compressed air with water vapour coming from a compressor. The compressed gas from the compressor 13 spreads over the main canalization 7 and the auxiliary canalization 8. The gas going through the main canalization 7 passes through the cooler 32 and the ejector 10 and is led via the room 17 through the drying element 15, where an amount of moisture from the gas is adsorbed and/or absorbed. The dried gas leaves the device 1 through the outlet 12.

The regeneration of the adsorption and/or absorption medium 6 occurs by means of the gas which is led through the auxiliary canalization 8. Hereby, the hot gas is led through the regeneration zone 5, where it takes up moisture, which is subsequently condensed and excreted in the cooler 9. The gas from the auxiliary canalization 8 is added back to the main flow by means of the ejector 10 and is led through the drying zone 4, whereby previously a moisture excretion is executed in the moisture excreter 42. The cooler 32 is also responsible for the cooling of the gas from the main current, so that moisture is easily excreted in the drying zone 4.

It is to be noted hereby that, the lower the temperature of the cooler 32, the more efficient the taking up of moisture of the drying zone will be.

Figure 2:
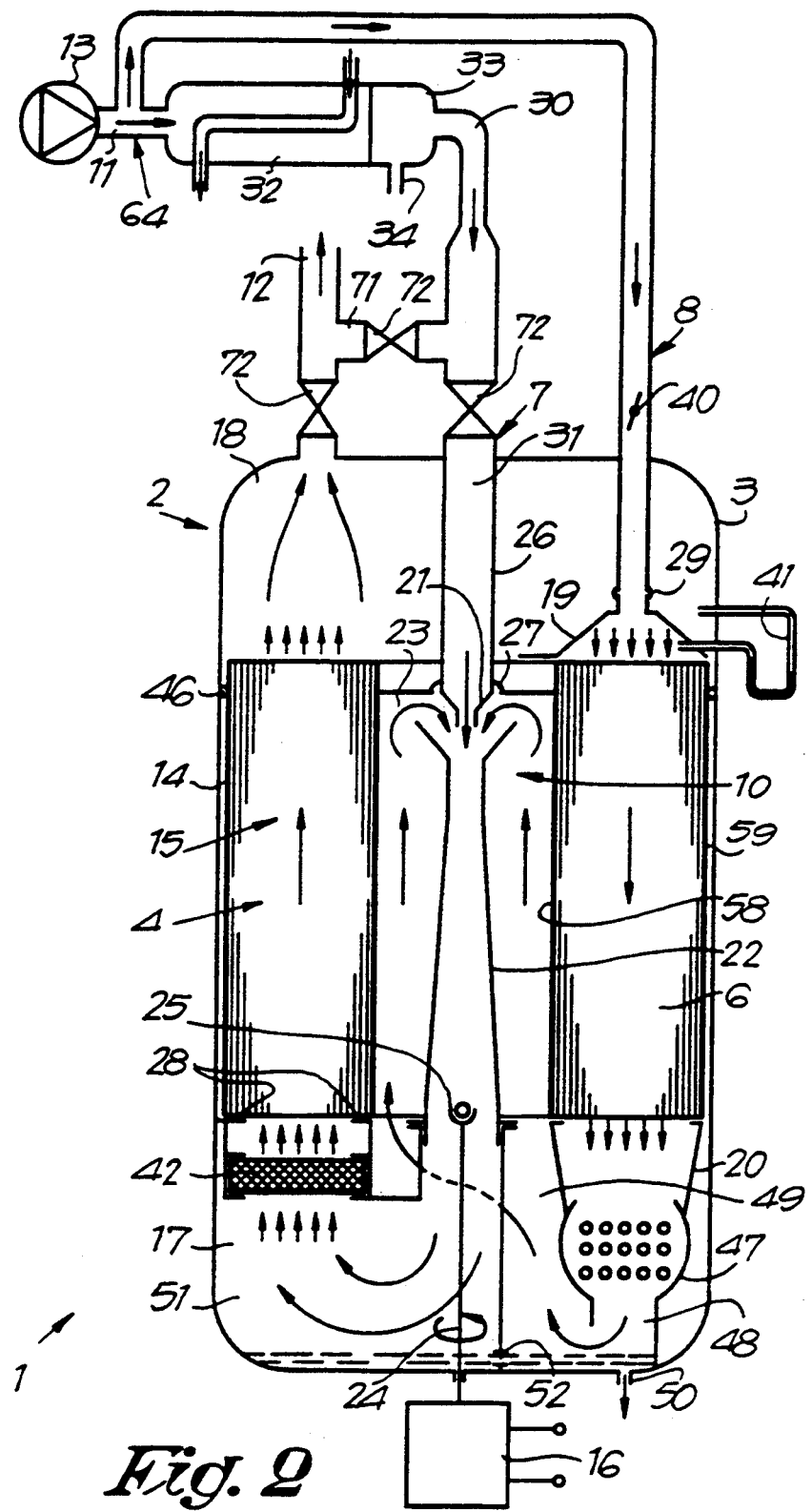
FIGS. 2 to 8 represent a number of variants of the device according to FIG. 1.

In FIG. 2, a variant is represented whereby the regeneration gas is cooled by means of a cooler 47 which is integrated in the dryer 2, more specifically in the pressure vessel 3. This permits the cooler 47 to be of a simpler construction.

The outlet piece formed by the screen 20, through which the regeneration gas is led out of the regeneration zone 5 can thus be used as a connection piece to the cooler 47. The outlet 48 of the cooler 47 opens out on a screened room 49 which is connected to the suction opening 23 of the ejector 10. This offers the advantage that the use of the conduits 36 and 38 from FIG. 1 is excluded.

The device 1 of FIG. 2 also offers the advantage that it can be constructed with only one condensate discharge 50 in the wall of the pressure vessel 3. This discharge 50 is preferably directly connected to the room 49. In order to obtain that only one discharge 50 is necessary, a small opening 52 is provided at the bottom of the wall between the rooms 49 and 51, forming a passage for the condensate.

Figure 3:
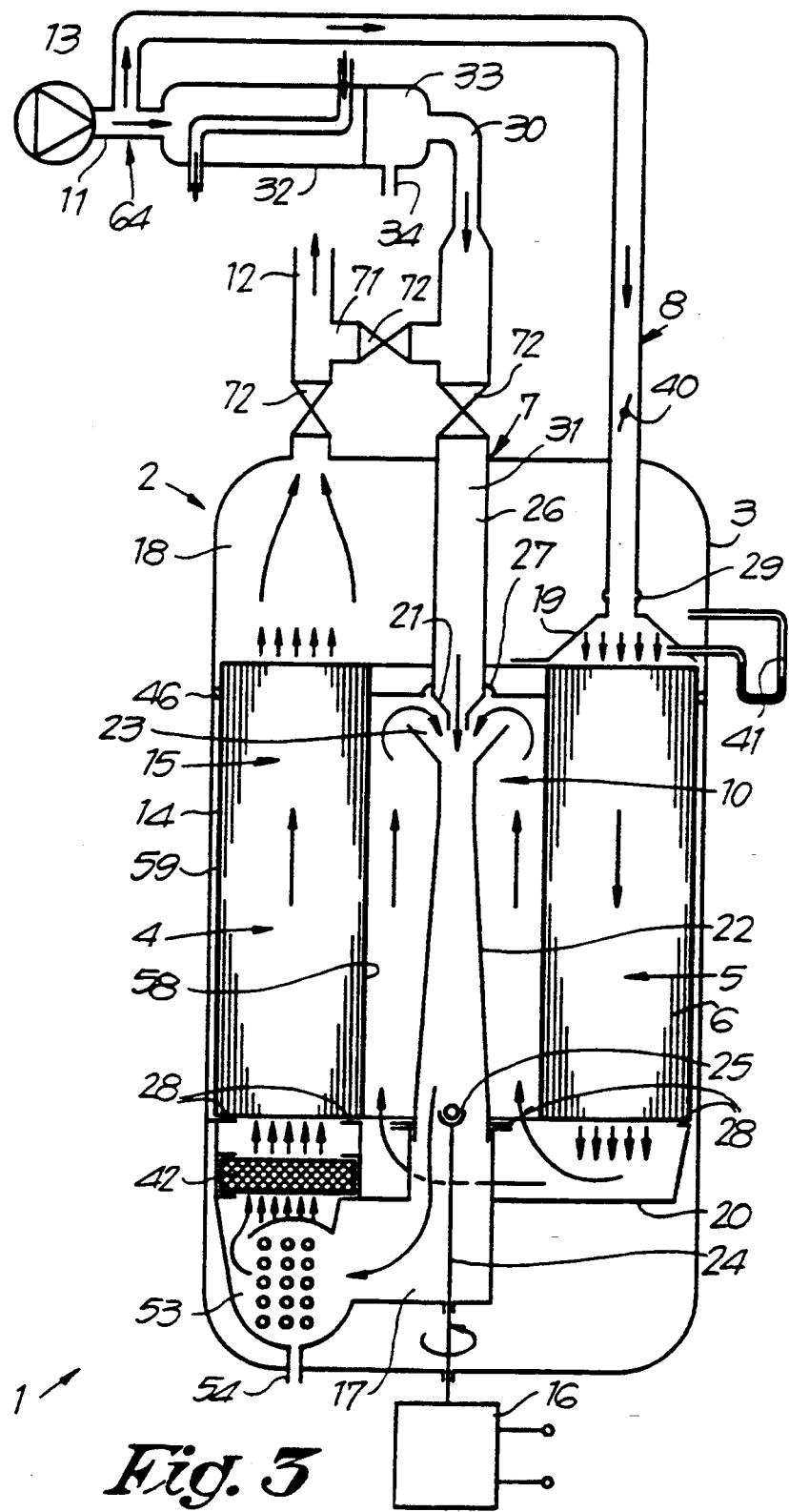

In FIG. 3, a variant is represented in which use is made of a cooler 53 integrated in the pressure vessel 3, which cooler 53 is placed in front of the inlet of the drying zone 4, which does need to cool the full air current, but at a lower temperature level. This offers among other things the advantage that the device has only one place in which condensation products are formed, namely in the cooler 53, which is therefore provided with a condensate outlet 54. An other important advantage exists in that there are less wet surfaces, thus limiting the necessity of using stainless materials or surface treatments.

Figure 4:
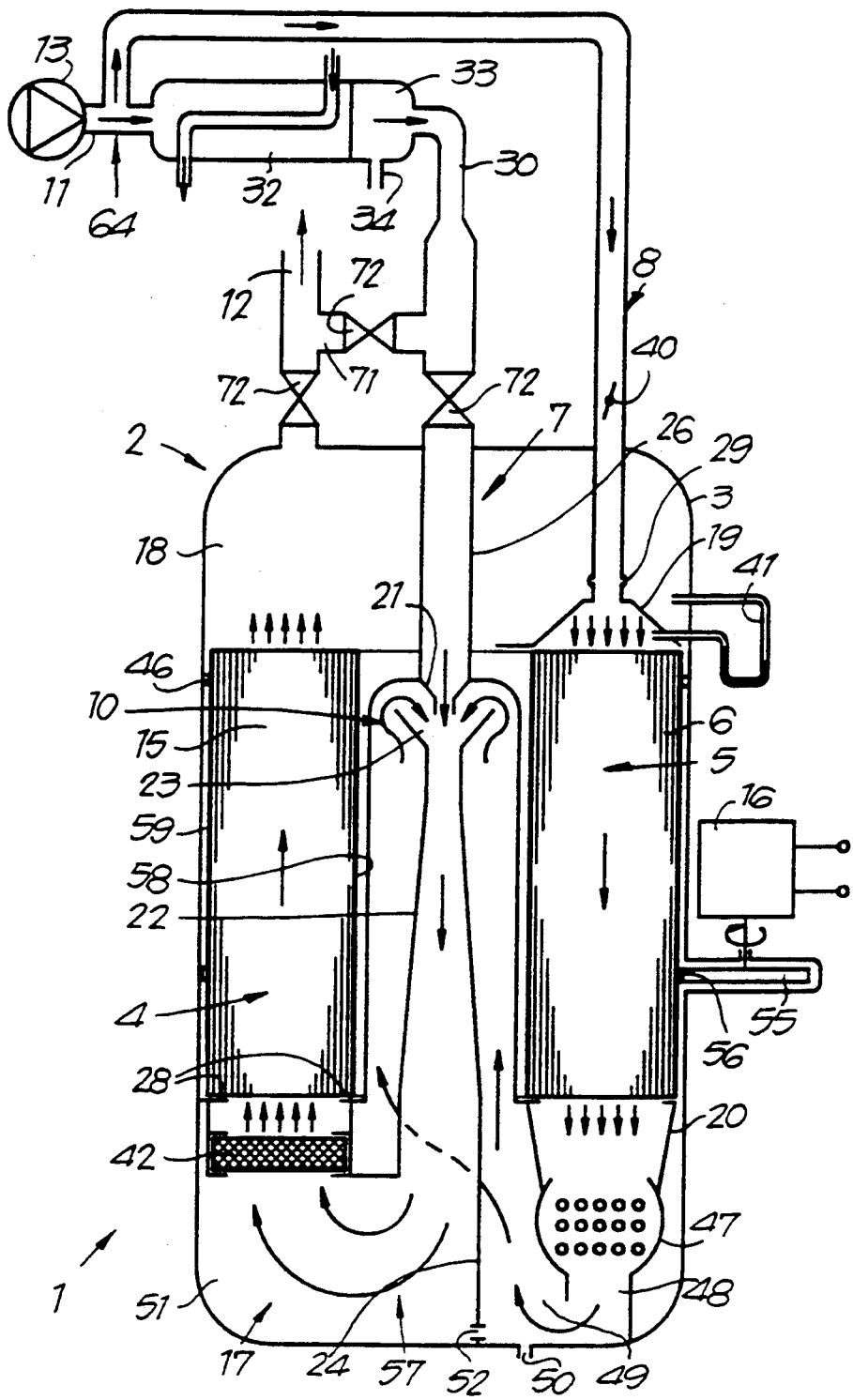

FIG. 4 represents a variant in which the ejector 10 is integrated in the shaft of the rotor 14, but is static. The rotor is driven at the circumference of the rotor, for instance by means of gear-wheels 55 and 56 or by means of a belt or the like. The channel 57 formed by the blending pipe 22 and the wet room 17 is completely closed and does not go over a sliding sealing so that leaks are excluded. Moreover, the rotor 14 is in this case no longer loaded with torsion and presents a simpler construction. When replacing the drying element 15 it suffices to replace only the rotor 14 with the inner casing 58 and the outer casing 59, while the ejector 10 remains in place. The sealing at the ejector 10 is also dropped.

Figure 5:
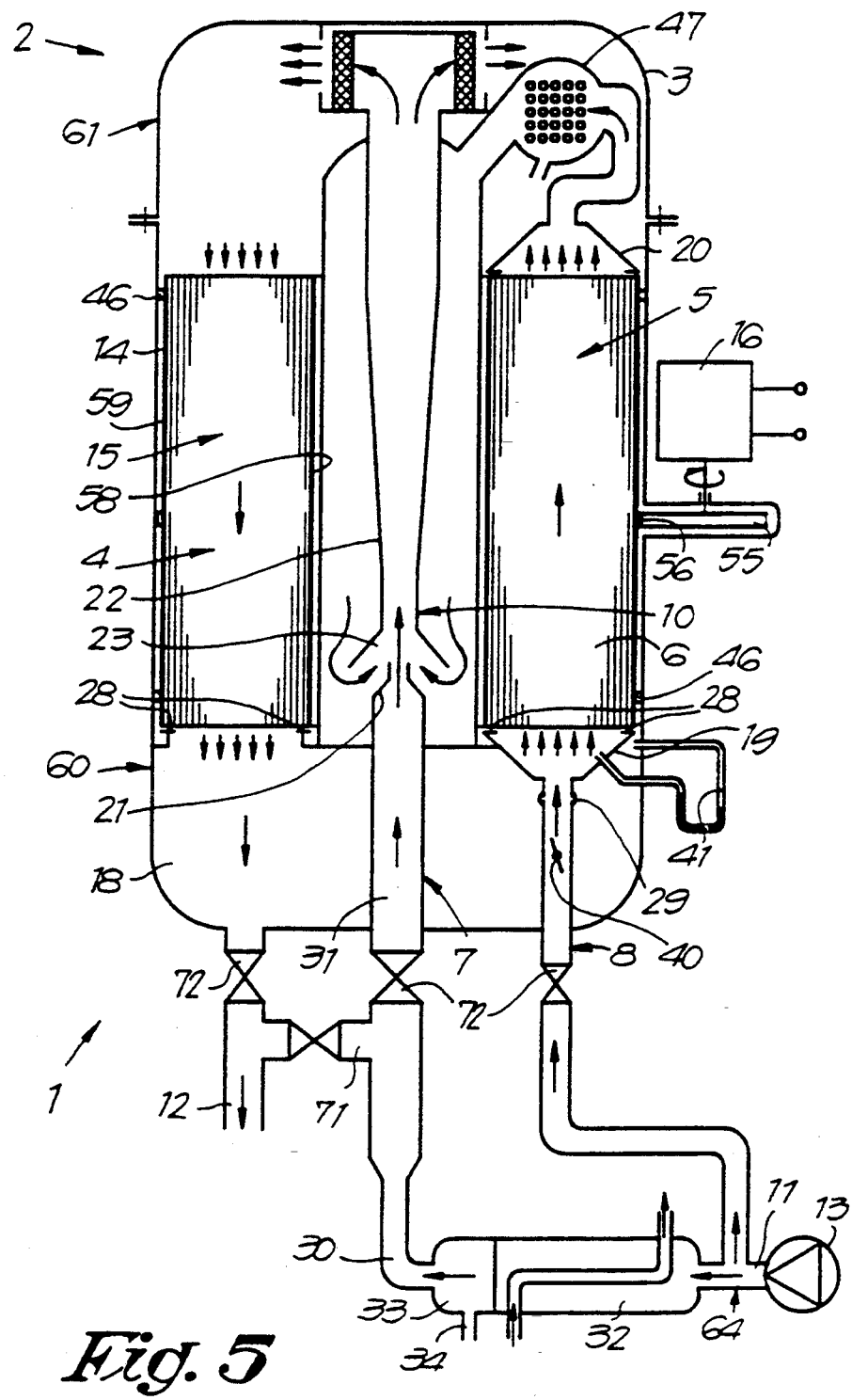

In FIG. 5 a variant is represented whereby the ejector 10 is also statically integrated in the rotor shaft. All pipe connections through the wall of the pressure vessel 3 are located in the bottom or are applied in the bottom vessel half 60, so that, when replacing the rotor 14, these connections need not be disconnected, and is suffices to remove the upper vessel half 61.

Figure 6:
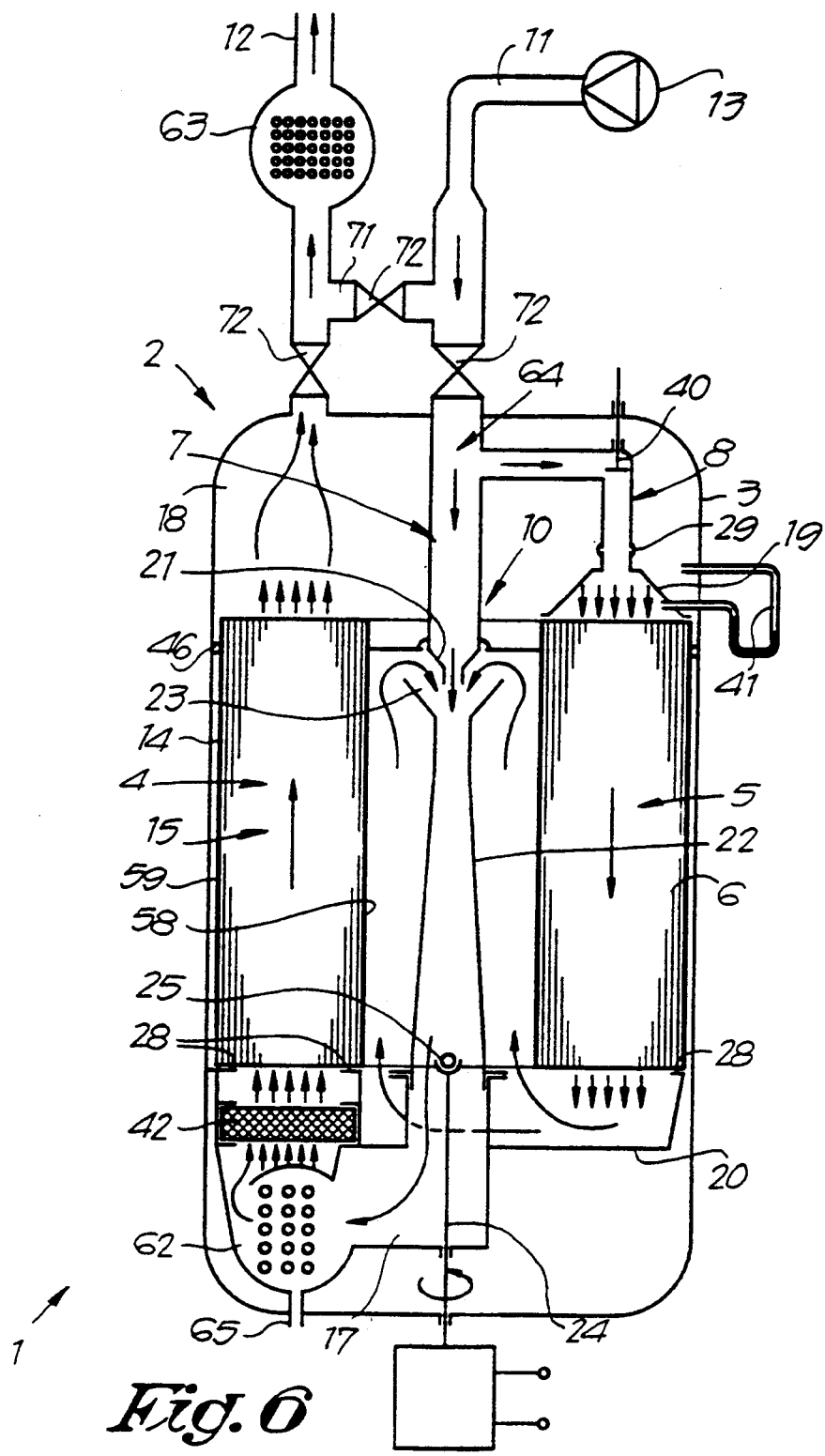

FIG. 6 represents an embodiment whereby the total hot air stream is brought to the dryer 2 without the presence of a separate cooler 32 as mentioned above. This makes the connection of the compressor 13 to the dryer 2 considerably easier. The cooling of the gas takes place by means of a cooler 62 which is mounted inside the pressure vessel 3. An after-cooler 63 is also needed when the dryer 2 is switched in circuit by means of the valves 72.

However, the cooler 62 now has to cool the total air stream, but this can take place with a lower entering temperature level. One of the most appropriate coolers for this application is a water-cooled pipe cooler with cooling water in the pipes and gas over the pipes, whereby the pipes are preferably provided with cooling fins at the outside.

The branching point 64 of the regeneration air is located inside the pressure vessel 3, thus allowing this pressure vessel 3 to present one penetration less.

This construction also offers the advantage that the screen 20 stays hot and dry, thus limiting the use of stainless materials or surface treatments.

The device 1 from FIG. 6 also offers the advantage that condensate is only collected in one place, so that only one condensate outlet 65 has to be provided.

Figure 7:
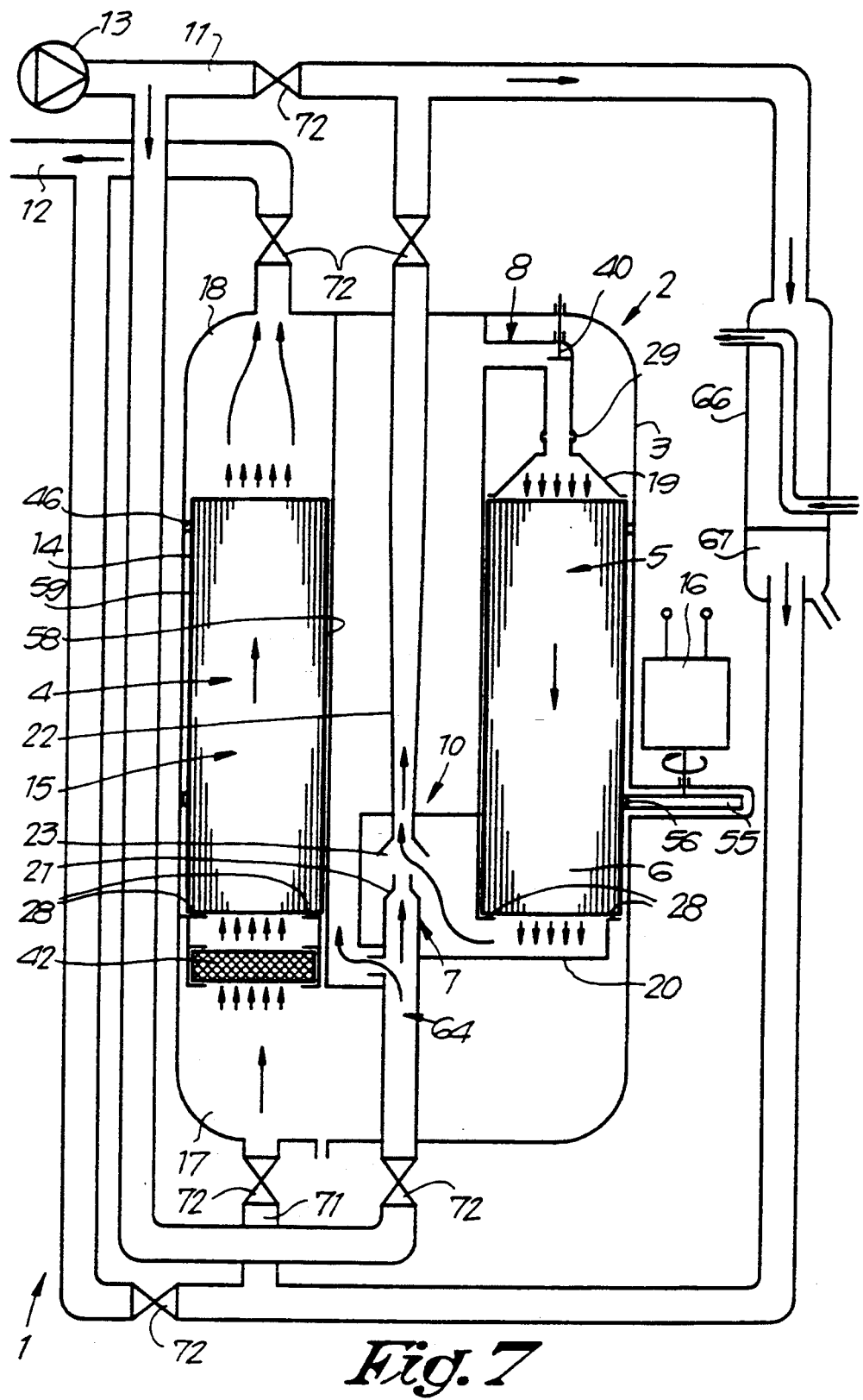

In FIG. 7 a variant of the embodiment according to FIG. 6 is represented, whereby said internal cooler 62 is replaced by an external cooler 66 with a water excreter 67.

Figure 8:
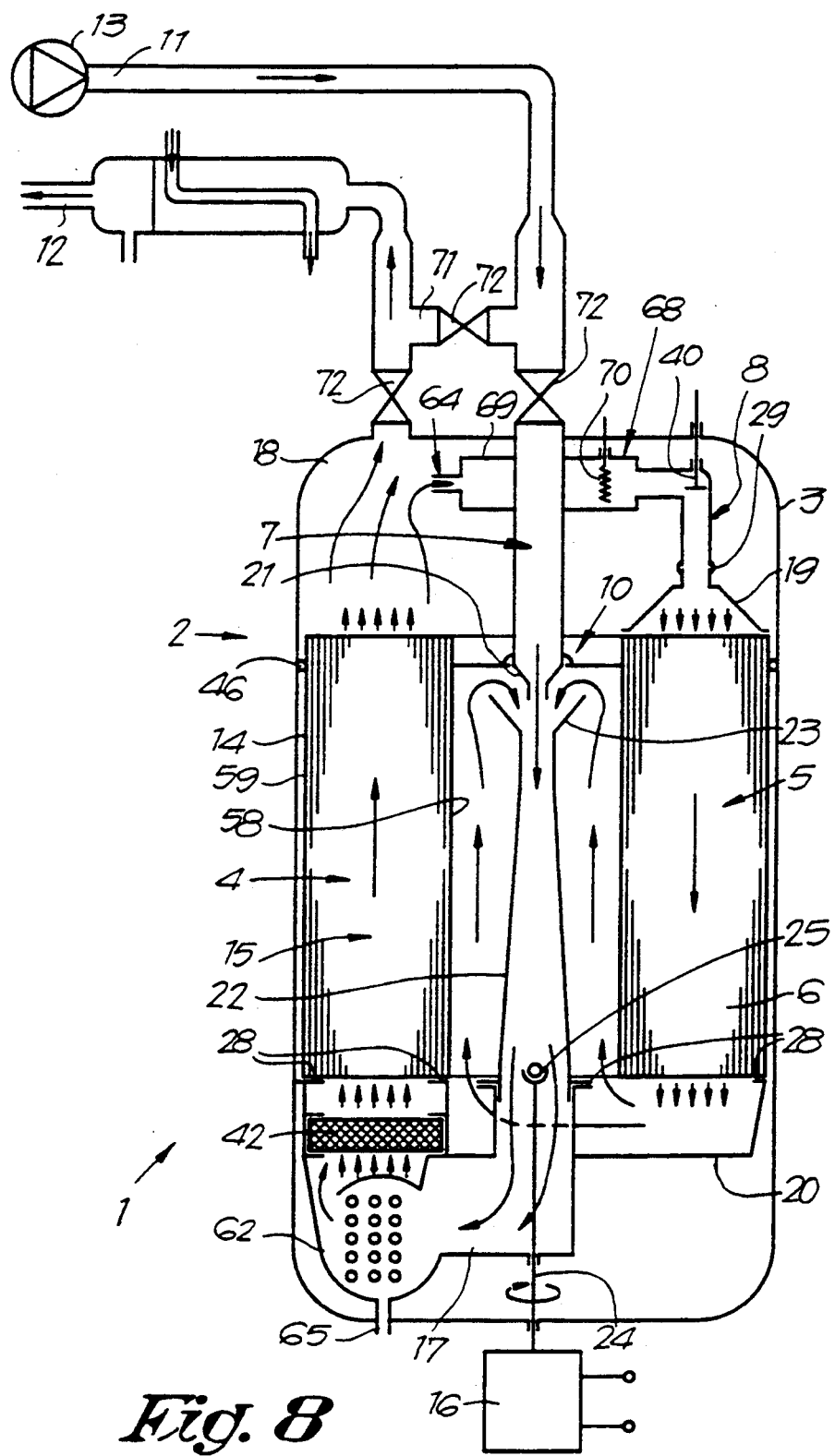

In FIG. 8 another device 1 according to the invention is represented, whereby the regeneration gas which is led through the auxiliary canalization 8 is branched away at the dry room 18 and is subsequently heated by means of a device 68. As represented, this device 68 can consist of a heat exchanger 69 which uses heat from the incoming total hot air current, helped by a heating element 70 or not.

The heated regeneration current has a much lower vapour tension than in case the hot gas from the compressor is used. The regeneration effect and thus also the drying effect are therefore much better.

All the above-described devices can be provided with different connection pipes 71, which allow the dryer 2 to be switched off or to be switched on. In order to use the different possibilities, the device is provided with the necessary valves 72.

The present invention is in no way limited to the embodiments described as examples and represented in the accompanying drawings, but can be realized in different forms and dimensions without leaving the scope of the invention.

I claim:

1. A device for drying a gas, comprising:
   a dryer including a pressure vessel and at least one of an adsorption medium and an absorption medium, said pressure vessel having a drying zone and a regeneration zone and said at least one of said adsorption medium and said absorption medium is alternatingly movable through said drying zone and said regeneration zone, and said dryer including means for making said adsorption medium and said absorption medium movable through said drying zone and said regeneration zone;
   a first conduit means, in communication with said drying zone, for delivering a first portion of the gas to said drying zone;
   a second conduit means, in communication with said regeneration zone, for delivering a second portion of the gas to said regeneration zone;
   means for causing the gas to become said first portion and said second portion prior to delivery through said first and second conduit means;
   a cooler in communication with said second conduit means, said cooler cooling said second portion of gas after said second portion of gas has passed through said regeneration zone; and
   a blending device disposed in said pressure vessel, said blending device being connected to said first and second conduit means so that said second portion of gas is fed via said blending device into said first conduit means and mixed with said first portion of gas,
   wherein the mixture of first and second portions of gas passes from said first conduit means through said at least one of said adsorption medium and said absorption medium in said drying zone and is dried in said drying zone, said second portion of gas passes from said second conduit means through said at least one of said adsorption medium and said absorption medium in said regeneration zone such that a moisture is introduced into said second portion of gas from said at least one of said adsorption medium and said absorption medium, and said cooler extracts a liquid from said second portion of gas.

2. A device according to claim 1, wherein said dryer includes a drying element in the form of a rotor which is rotatable around a vertical axis, said drying element including said at least one of said adsorption medium and said absorption meidum.

3. A device according to claim 2, wherein said blending device includes an ejector extending centrally through said rotor.

4. A device according to claim 3, wherein said ejector is mounted such that a flow of the gas passing therethrough is directed downwards.

5. A device according to claim 3, wherein the ejector includes a blending pipe connected to said rotor, whereby said blending pipe acts as a driving shaft for said rotor.

6. A device according to claim 3, wherein said ejector includes a static blending pipe.

7. A device according to claim 6, wherein said pressure vessel further comprises a room at a bottom portion thereof, said room being in communication with said blending pipe and said drying zone and forming with said blending pipe a channel between said blending pipe and said drying zone, said channel being completely closed.

8. A device according to claim 2, wherein said rotor is driven along its outer circumference.

9. A device according to claim 2, wherein said rotor includes said at least one of said adsorption medium and said absorption medium.

10. A device according to claim 1, wherein said cooler is located outside said pressure vessel and is mounted in said second conduit means.

11. A device according to claim 1, wherein said cooler is disposed in said pressure vessel.

12. A device according to claim 10, wherein the cooler is mounted in said second conduit means at an outlet of said regeneration zone.

13. A device according to claim 11, wherein said cooler is mounted between said blending device and said drying zone and cools the mixture of said first and second portions of gas.

14. A device according to claim 1, wherein a moisture excreter is mounted at an inlet of said drying zone.

15. A device according to claim 1, wherein a branching point exists where the said second conduit means is branched off from said first conduit means, and said branching point is located in said pressure vessel.

16. A device according to claim 1, further comprising means for creating a temperature difference between said first portion of gas in said first conduit means and said second portion of gas in said second conduit means.

17. A device according to claim 16, wherein said second conduit means branches off from said first conduit means at a branch point and said creating means includes a cooler which is mounted in said first conduit means between said branch point and said blending device.

18. A device according to claim 16, wherein said creating means includes a heating device which heats said second portion of gas in said second conduit means.

19. A device according to claim 18, wherein said heating device includes a heat exchanger which utilizes heat of a mixture of said first and second portions of gas.

20. A device according to claim 18, wherein said heating device includes a heating element.

21. A device according to claim 18, wherein the heating device is connected to a room into which an outlet of said drying zone opens.

22. A device according to claim 1, further comprising an after-cooler and wherein said regeneration zone and said blending device are directly connected to an inlet of said device, said cooler is mounted between said drying zone and said blending device, and said after-cooler is mounted between said drying zone and an outlet of said device.

23. A device according to claim 1, wherein said dryer includes a vertically mounted rotor which is placed on a support forming a flat bearing for said rotor.

24. A device according to claim 1, further comprising a compressor which generates said gas such that said gas is compressed.

* * * * *